US012679588B2

(12) United States Patent
Eller

(10) Patent No.: US 12,679,588 B2
(45) Date of Patent: Jul. 14, 2026

(54) SYSTEMS AND METHODS FOR LABELING VARIOUS SHAPES OF CONTAINERS IN A UNIT-OF-USE MACHINE

(71) Applicant: INNOVATION ASSOCIATES, INC., Johnson City, NY (US)

(72) Inventor: Charles Edward Eller, Prescott, AZ (US)

(73) Assignee: INNOVATION ASSOCIATES, INC., Binghamton, NY (US)

( * ) Notice: Subject to any disclaimer, the term of this patent is extended or adjusted under 35 U.S.C. 154(b) by 48 days.

(21) Appl. No.: 18/676,036

(22) Filed: May 28, 2024

(65) Prior Publication Data

US 2024/0391630 A1 Nov. 28, 2024

Related U.S. Application Data

(60) Provisional application No. 63/469,199, filed on May 26, 2023.

(51) Int. Cl.

| | |
|---|---|
| ***B32B 41/00*** | (2006.01) |
| ***B65C 9/06*** | (2006.01) |
| ***B65C 9/28*** | (2006.01) |
| ***B65C 9/36*** | (2006.01) |
| ***B65C 9/40*** | (2006.01) |

(52) U.S. Cl.

CPC .................. *B65C 9/06* (2013.01); *B65C 9/28* (2013.01); *B65C 9/36* (2013.01); *B65C 9/40* (2013.01)

(58) Field of Classification Search

CPC .... B65C 9/06; B65C 9/28; B65C 9/36; B65C 9/40

USPC .................... 156/60, 64, 350, 351, 378, 379

See application file for complete search history.

(56) References Cited

U.S. PATENT DOCUMENTS

| | | | |
|---|---|---|---|
| 6,318,630 | B1 | 11/2001 | Coughlin et al. |
| 6,755,931 | B2 | 6/2004 | Vollm et al. |
| 6,892,780 | B2 | 5/2005 | Vollm et al. |
| 7,072,737 | B2 | 7/2006 | Lunak et al. |
| 7,228,198 | B2 | 6/2007 | Vollm et al. |
| 7,918,402 | B2 | 4/2011 | Conlon et al. |
| 8,025,085 | B2 | 9/2011 | Skaggs et al. |
| 8,141,330 | B2 | 3/2012 | Henkel |
| 8,405,875 | B2 | 3/2013 | Eckert et al. |
| 8,474,691 | B2 | 7/2013 | Schuck |
| 8,601,776 | B2 | 12/2013 | Henkel |
| 8,615,971 | B2 | 12/2013 | Freudelsperger |
| 8,869,861 | B2 | 10/2014 | Bouchelle et al. |
| 8,875,865 | B2 | 11/2014 | Terzini |
| 8,973,338 | B2 | 3/2015 | Terzini |
| 9,400,933 | B2 | 7/2016 | Jaynes |
| 9,483,897 | B2 | 11/2016 | Terzini |
| 9,665,688 | B2 | 5/2017 | Terzini et al. |
| 9,697,669 | B2 | 7/2017 | Terzini |

(Continued)

*Primary Examiner* — Michael N Orlando
*Assistant Examiner* — Joshel Rivera
(74) *Attorney, Agent, or Firm* — K&L GATES LLP

(57) ABSTRACT

Systems and methods for labeling various shapes of containers are disclosed. The systems and methods simplify the complete process of labeling by only requiring a pick point to retrieve the container and a single labeling position that is not container specific. The picking and labeling are agnostic to the container. The system only cares that the container is picked and labeled on consistent axes. This insures reliable label placement and easy container implementation into the system.

18 Claims, 9 Drawing Sheets

(56) References Cited

U.S. PATENT DOCUMENTS

| | | | |
|---|---|---|---|
| 10,035,258 B2 | 7/2018 | Davis et al. | |
| 10,219,984 B2 | 3/2019 | Longley et al. | |
| 10,669,098 B1 | 6/2020 | Terzini et al. | |
| 11,345,547 B1 | 5/2022 | Terzini et al. | |
| 11,521,454 B1 | 12/2022 | Terzini | |
| 2006/0277269 A1* | 12/2006 | Dent ........................ | G07F 11/42 709/217 |
| 2022/0201342 A1 | 6/2022 | Björkman et al. | |
| 2022/0324600 A1 | 10/2022 | Berkley et al. | |
| 2022/0363481 A1 | 11/2022 | Terzini et al. | |

* cited by examiner

SYSTEMS AND METHODS FOR LABELING VARIOUS SHAPES OF CONTAINERS IN A UNIT-OF-USE MACHINE

RELATED APPLICATIONS

This application claims the benefit of and priority to U.S. Provisional Patent Application No. 63/469,199 filed May 26, 2023, entitled "A METHOD FOR LABELING VARIOUS SHAPES OF CONTAINERS IN A UNIT-OF-USE MACHINE," which is incorporated herein by reference in its entirety.

TECHNICAL FIELD

This disclosure relates generally to robotic labeling of medicament containers.

BACKGROUND OF THE INVENTION

Many medications in a pharmacy are supplied from the manufacture in a ready to use container. After a doctor writes a prescription the pharmacy fulfills the prescription for the patient. Typical prescription containers in the US pharmacy market are removed from a storage location by a pharmacy technician and a label is applied to the container by the technician. The containers come in many shapes and sizes, which makes automated labeling difficult without extensive programing of a robot or other mechanical complexities. For example, a pharmacy may supply prescriptions in pill bottles, liquid medicine bottles, blister packs, boxes, etc. Each of these containers may come in different sizes depending on the amount of pills or volume of liquid medicament distributed. Further, these containers may be made of any numbers of materials (such as glass or plastic) with varying thicknesses.

Existing systems are complex and require extensive programming to handle the multitude of types and sizes of containers used in a pharmacy. Current automation in the field uses complex methods to get a label attached to a container. One method used is to place the container into a carrier that moves the container to a second location where the container is transferred to a labeling mechanism. This labeling mechanism then must locate the product for labeling and in the case of a cylindrical container must rotate the container to wrap the label around package. An alternate method used is to use a robot to pick the container and then to program multiple robot-moves to identify the container and wrap the label around the container.

The complexity and need of programming limit the use of these machines in the marketplace. Pharmacy containers change in a facility frequently due to supply chain and competitive forces. Complex changeover to add and subtract products from a machine limit the machine's potential uses and usefulness in a pharmacy.

Simplified systems, methods, and apparatuses are needed to streamline this cantankerous process.

SUMMARY OF THE INVENTION

The present disclosure contains new and innovative systems, methods, and apparatuses to simplify the process of labeling medicament containers by using a pick point to retrieve the container and a labeling position that is not container-specific. This automatically performs the functions of fulfilling a prescription for a patient at a pharmacy after a doctor writes a prescription. The picking and labeling are agnostic to the type of container being labeled. The systems and methods enable picking and labeling the container on at least one shared axis. The systems and methods ensure reliable label placement and easy container implementation. The present disclosure reduces mechanical and programming complexity by picking and labeling about a common axis—greatly simplifying the automation and improving the reliability of the process. The result of the process is a labeled medicament container.

One advantage of the systems and methods herein is that the two actions of picking and labeling are both done around the same center axis to insure a balanced, self-centering of the container picking and labeling. Another advantage is that the systems and methods allow many different containers to be simply picked and labeled automatically without human intervention. It should be appreciated that the systems, methods, and apparatuses herein are not limited to labeling medicament containers, but can be used on any system which places labels onto goods.

In light of the disclosure set forth herein, and without limiting the disclosure in any way, in a first aspect, which may be combined with any other aspect described herein, or portion thereof, a system includes a picking device that grabs at least one container and moves it to a labeling device that attaches the label onto the at least one container. The invention does this by matching the center of the picking location with the center of the labeling location and applying the label with a tamper head that complies to the label surface on each side of the center of the at least one container.

In another aspect of the present disclosure, which may be combined with any other aspect described herein, or portion thereof, a feeder is configured to move the at least one container to the picking location.

In another aspect of the present disclosure, which may be combined with any other aspect described herein, or portion thereof, the picking device grabs the container from a feeder.

In yet another aspect of the present disclosure, which may be combined with any other aspect described herein, or portion thereof, the center of the picking location defines a pick head axis along which the container is picked.

In yet another aspect of the present disclosure, which may be combined with any other aspect described herein, or portion thereof, an actuator comprises the picking device, the picking device comprising a pick head configured to grab or pick the at least one container about the pick head axis.

In yet another aspect of the present disclosure, which may be combined with any other aspect described herein, or portion thereof, the actuator is configured to move the at least one container from a picking location to a labeling location.

In yet another aspect of the present disclosure, which may be combined with any other aspect described herein, or portion thereof, the actuator is configured to provide the at least one container to the labeling location along a labeling axis.

In yet another aspect of the present disclosure, which may be combined with any other aspect described herein, or portion thereof, the pick head axis is parallel to the labeling axis.

In yet another aspect of the present disclosure, which may be combined with any other aspect described herein, or portion thereof, the pick head axis is the same as the labeling axis.

In yet another aspect of the present disclosure, which may be combined with any other aspect described herein, or portion thereof, a labeler is disposed within the labeling location.

In yet another aspect of the present disclosure, which may be combined with any other aspect described herein, or portion thereof, the labeler comprises a tamp head.

In yet another aspect of the present disclosure, which may be combined with any other aspect described herein, or portion thereof, the tamp head comprises a stamp.

In yet another aspect of the present disclosure, which may be combined with any other aspect described herein, or portion thereof, the stamp comprises a rigid material.

In yet another aspect of the present disclosure, which may be combined with any other aspect described herein, or portion thereof, the stamp comprises a flexible material configured to conform to the shape of the at least one container.

In yet another aspect of the present disclosure, which may be combined with any other aspect described herein, or portion thereof, a label is provided to the labeler.

In yet another aspect of the present disclosure, which may be combined with any other aspect described herein, or portion thereof, the label comprises an adhesive side.

In yet another aspect of the present disclosure, which may be combined with any other aspect described herein, or portion thereof, the label is provided in a folded configuration such that at least one point of the adhesive side is able to contact the at least one container before any other point of the label.

In yet another aspect of the present disclosure, which may be combined with any other aspect described herein, or portion thereof, the stamp is configured to contact the label and apply pressure between the label and the at least one container such that the label is adhesively affixed to the at least one container.

In yet another aspect of the present disclosure, which may be combined with any other aspect described herein, or portion thereof, the stamp is configured to be removed from contact with the label once a threshold pressure measurement is reached.

In yet another aspect of the present disclosure, which may be combined with any other aspect described herein, or portion thereof, the stamp is configured to move along the perimeter of the at least one container not to exceed a threshold pressure measurement such a previously non-contacting portion of the label is put into contact with the at least one container.

In yet another aspect of the present disclosure, which may be combined with any other aspect described herein, or portion thereof, the system is configured to run without any human intervention.

Additional features and advantages of the disclosed system, method, and apparatus are described in, and are apparent from, the following Detailed Description and the Figures.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations.

DETAILED DESCRIPTION OF THE DRAWINGS

Picking of Medicament Container

Figure 1A:
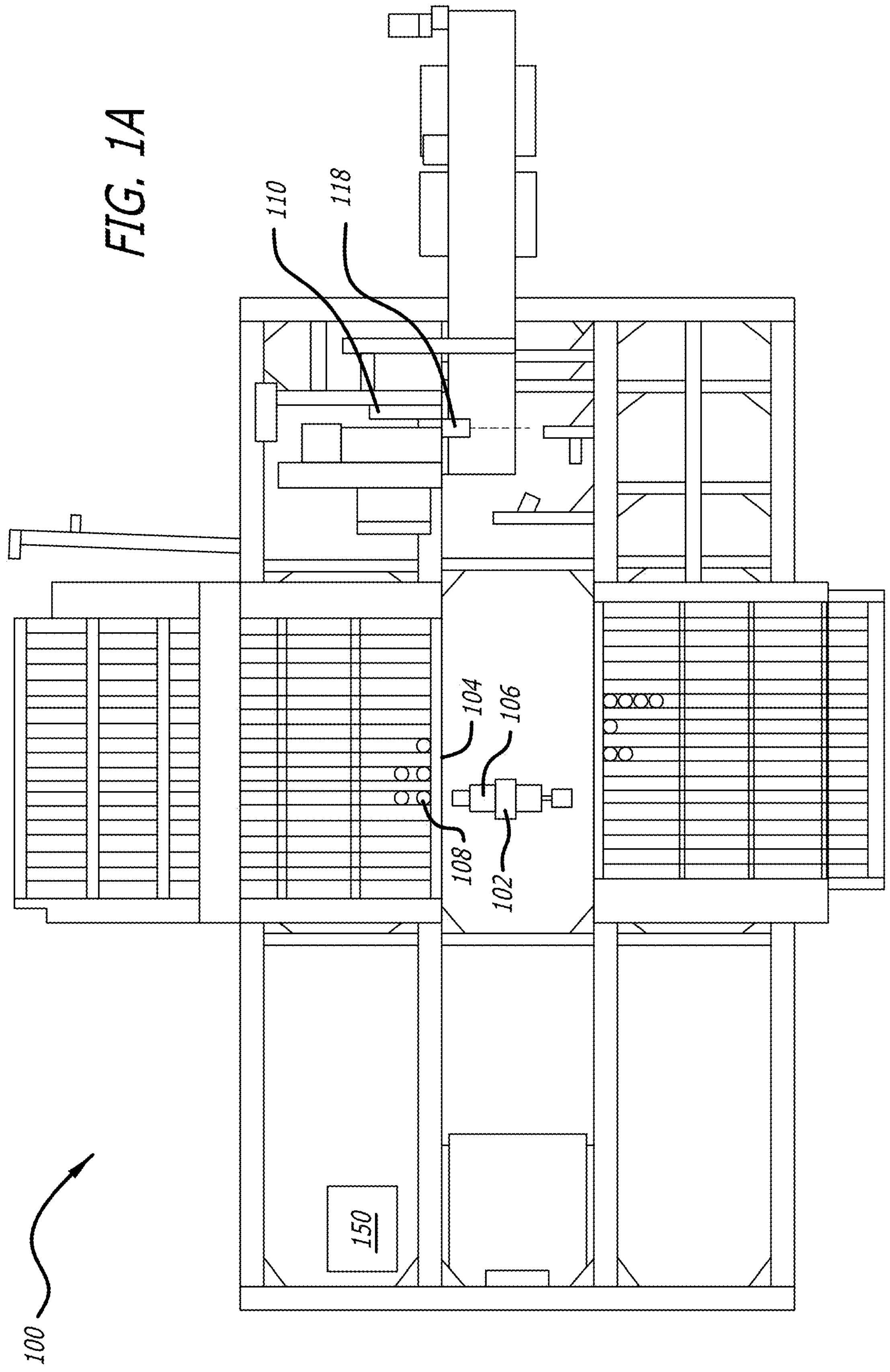
FIG. 1A illustrates a top view of an embodiment of a a medicament container system according to the present disclosure.
Figure 1B:
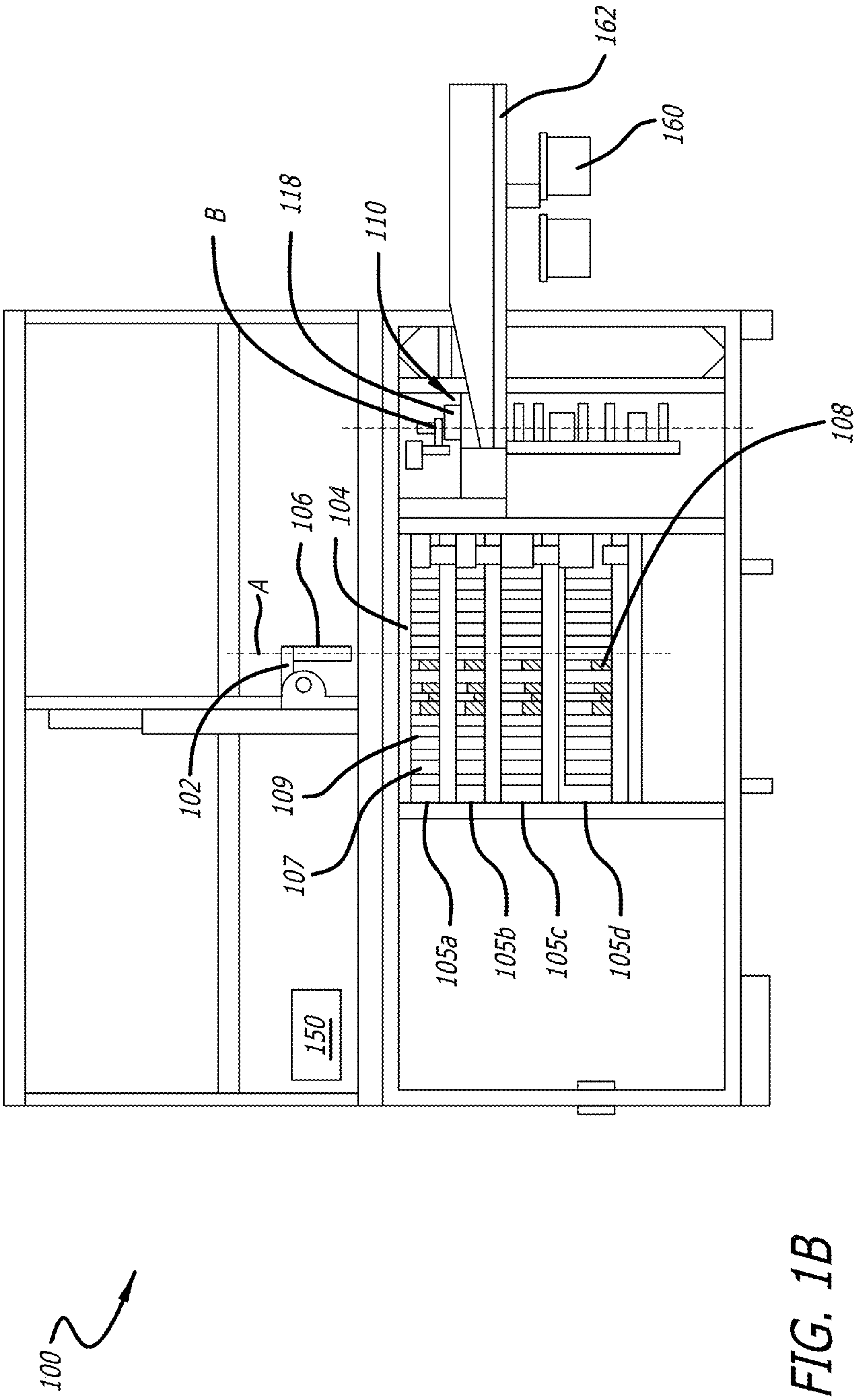
FIG. 1B illustrates a side view of an embodiment of the system according to the present disclosure.
Figure 1C:
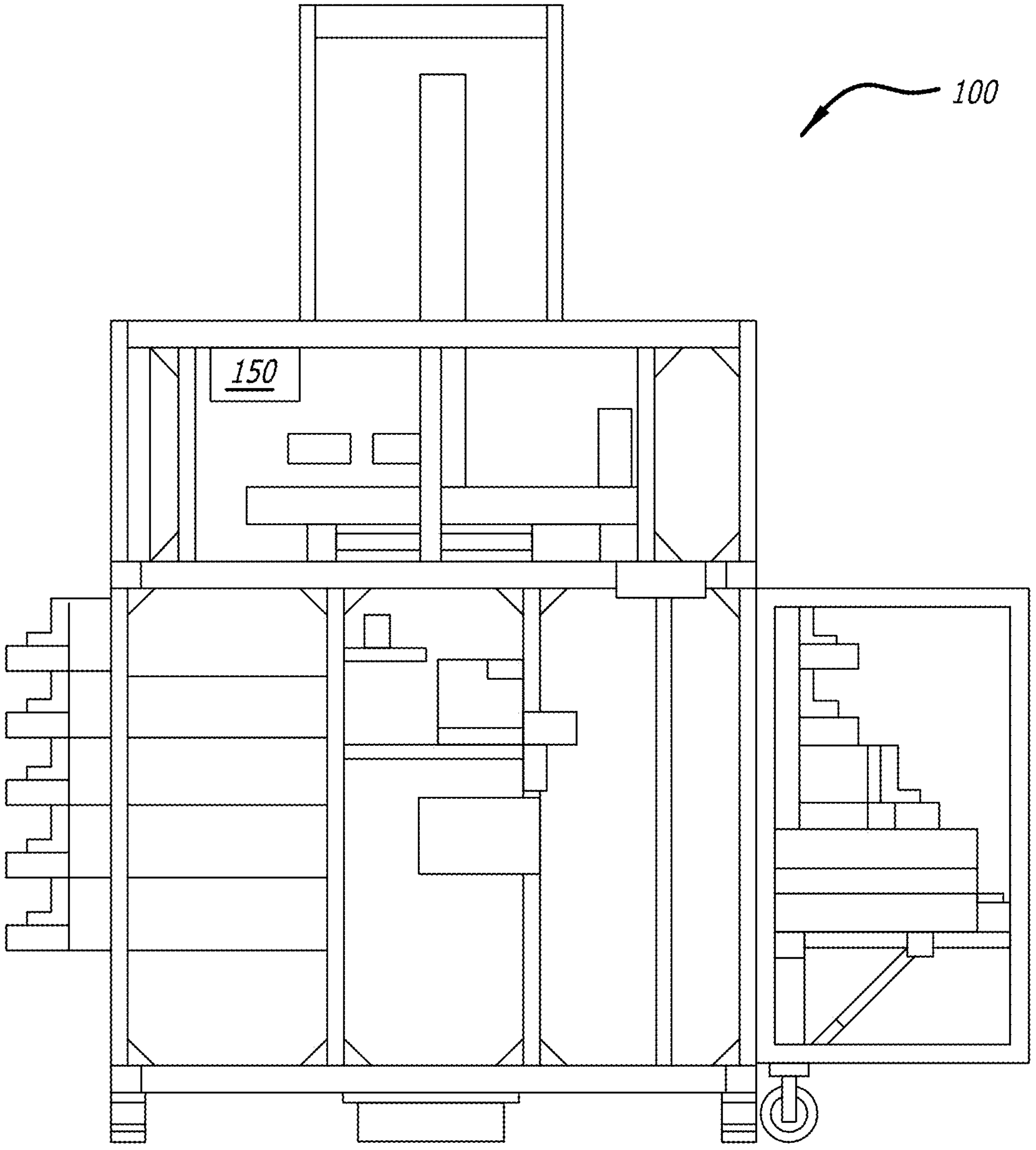
FIG. 1C illustrates a front view of an embodiment of the system according to the present disclosure.
Figure 1D:
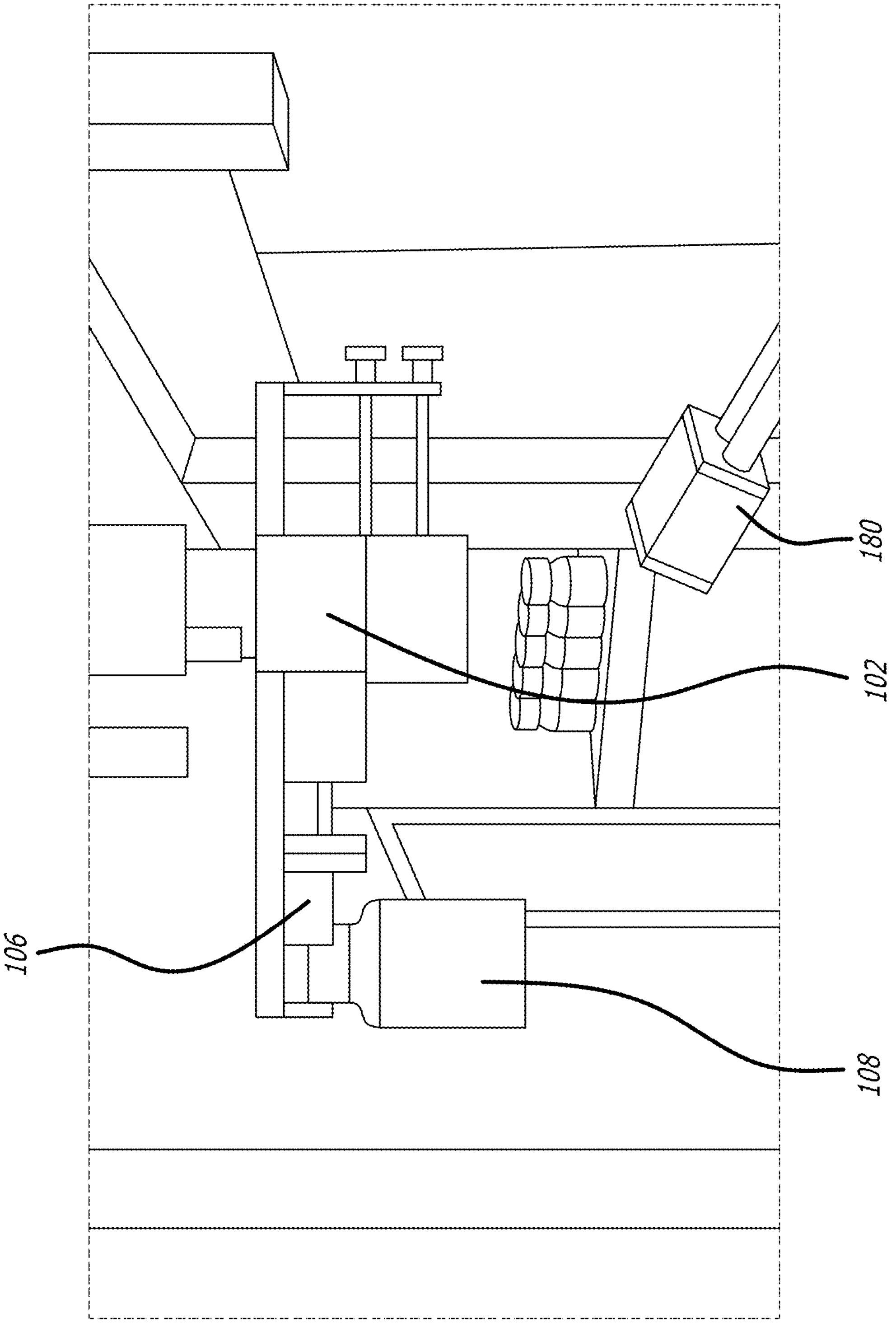
FIG. 1D illustrates a close-up of an actuator and a pick head from the embodiment according to FIGS. 1A-1C.

Referring now to the drawings and in particular to FIGS. 1A-D, a medicament container system 100 is illustrated according to an embodiment. The medicament container system 100 comprises an actuator 102 with a pick head 106 configured to grab onto or pick at least one medicament container 108 from a feeder 104. The feeder 104 is a mechanism configured to move a medicament container 108 into a picking position or picking location, where the pick head 106 can effectively contact the medicament container 108.

The medicament container system 100 accomplishes this preferably through the use of a processor 150 operatively coupled to the medicament container system 100. The processor 150 may comprise a programmable logic controller ("PLC"). The processor 150 may specify what medicament container 108 to pick and what label to put on that medicament container 108. This information may be based on a prescription request sent to the processor 150 from a pharmacist or from an outside source through software loaded onto the processor 150. The processor 150 may confirm that the correct medicament container 108 is being labeled by processing an image from a camera 180 operatively coupled to the processor 150. The camera 180 may alternatively be a bar code scanner or QR code reader. The processor 150 may also confirm that the medicament container 108 has been labeled correctly by processing an image from the camera 180. Multiple cameras 180, bar code scanners, or QR code readers can be employed, separately or in combination, in order to gain a desired amount of verification and verification steps. In some embodiments, an image from the camera may be used to gather image data, bar code data, and QR code data. The processor 150 may employ commercially available software, proprietary software, and/or artificial intelligence software in order to perform the processing of the images from the camera 180.

The feeder 104 may be passive in moving the medicament container 108 in that a medicament container 108 may be placed on a sloped surface of the feeder 104 which funnels to the picking location or a medicament container 108 could be placed on a flat surface of the feeder 104 with a spring configured to move the medicament container 108 transversely along the flat surface of the feeder 104, which may be preferable in instances where multiple medicament containers 108 corresponding to the same type of medicament are loaded in a row along the surface. Alternatively, the feeder 104 may actively move the medicament container 108 by means of a coil like that of a vending machine, a conveyer belt with or without vertical flaps to keep the medicament container 108 upright, a piston, or any other sufficient means of actively moving the medicament container 108. The feeder 104 may have a plurality of shelves. In one embodiment, the feeder 104 has four shelves 105*a-d*, each with a plurality of rows 107 which may contain at least one medicament container 108. The shelves 105*a-d* may be modular in that the width of the rows 107 can be adjusted depending on the size of the medicament container 108 that will reside in that row 107. The width may be adjustable by moving a row separator 109. A ruler may be affixed to each shelf 105*a-d* such that the width of each row 107 can be easily seen. The ruler may aid in determining the location of each medicament container 108 for the actuator 102. In one embodiment, a human operator preprograms the processor 150 with the width of each row 107 and a height of the medicament container 108 in each row 107. In another embodiment, a camera, communicatively coupled to the processor 150, is configured to capture an image of the ruler and the processor 150 is configured to read the ruler at the outer bounds of the width of the medicament container 108 or at the row separators 109 bounding the width of the medicament container 108. In any embodiment, further data that may be collected for storage at the processor 150 or memory may include the height, width, depth, diameter(s), cap diameter, cap height, or any other pertinent information about the medicament containers 108. In this manner the actuator 102 can consistently pick the medicament container 108 in any given row 107 at a consistent location on the medicament container 108. The medicament containers 108 may be fed into the feeder 104 by a conveyor system, by a human operator, by another machine, or in any other appropriate manner.

The medicament container 108 may have at least one circular portion, which may be disposed on a top portion of the medicament container 108. The medicament container 108 may be any number of shapes and/or sizes depending on such factors as the preference of the manufacturer, the amount of medicament in a single medicament container 108, whether the medicament is a liquid or solid, whether the medicament is in a pill form, or any other number of factors. The medicament container system 100 of the present disclosure is configured to operate consistently no matter the size and/or shape of the medicament container 108 and may be agnostic as to the size and/or shape of the medicament container 108. Having at least one circular portion on the top portion of the medicament container 108 simplifies the steps of the medicament container system 100 by allowing a more consistent reference point for the medicament container system 100. However, it should be noted that this is a preferred embodiment and not meant to limit the present disclosure to the employment of medicament containers 108 with a circular portion or where the circular portion is disposed on the top portion of the medicament container 108. The medicament container 108 may be of any type supplied, such as in a box or a blister pack.

At an appropriate time, the actuator 102 moves the pick head 106 into a position in which the pick head 106 can operatively contact a desired medicament container 108. The pick head 106 may be configured to grab a medicament container 108 using at least one grabbing surface such as a ring-shaped surface configured to fit around a top of the medicament container 108. Any number of grabbing mechanisms could be employed by the pick head 106 alone or in combination, such as a series of two or more finger-tip-like structures configured to grab an edge of the medicament container 108 or around a top of the medicament container 108, two or more plates that contact opposing sides of a medicament container 108 (such as in the embodiment illustrated in FIG. 1D) which plates may comprise geometries configured to conform to or nest with a geometry of the medicament container 108, a suction cup configured to grab onto a side or the top of an medicament container 108, an adhesive surface configured to stick to a side or the top of the medicament container 108, or a tray configured to slide under a bottom of the medicament container 108, to name just a few. Any arrangement or combination of the above-listed pick head 106 configurations and their equivalents is contemplated. In any regard, the pick head 106 is configured to pick or grab the medicament container 108 about a pick head axis A, such that the medicament container 108 is able to remain at least substantially parallel in relation to the pick head axis A. The actuator 102 may comprise a robotic conveyance system, such as in the embodiment illustrated in FIG. 1D. The robotic conveyance system may be configured to move along rails on three axes, preferable orthogonal axes, as well as swivel along at least one plane, preferably a plane associated with a horizontal axis according to the current position of the actuator 102. Alternatively, the actuator may comprise a robotic arm with a full six degrees of freedom of motion and with a base disposed inside the medicament container system 100.

The processor 150 may be configured to direct the actuator 102 to move to a different row 107, for example, if the primary row of that type of medicament container 108 is empty or to distribute more evenly which rows 107 are drawn from to maintain a first-in-first-out process or any other logical process, possibly including randomization.

The actuator 102 is then configured to move the pick head 106 with the operatively coupled medicament container 108 to a labeler 110. The labeler 110 comprises a tamp head 118 with a tamp head axis B. The tamp head axis B may be substantially parallel to the pick head axis A such that the medicament container 108 is in a substantially similar position after being moved by the actuator 102 as when it was residing in the feeder 104 at the picking location. In one embodiment, each of the medicament containers 108 has a circular portion disposed on a top portion of the medicament container 108 and each medicament container 108 is placed in relation to the tamp head axis B such that the circular portion of each medicament container 108 is concentric when moved to the labeler 110.

Labeling Operation

Figure 2A:
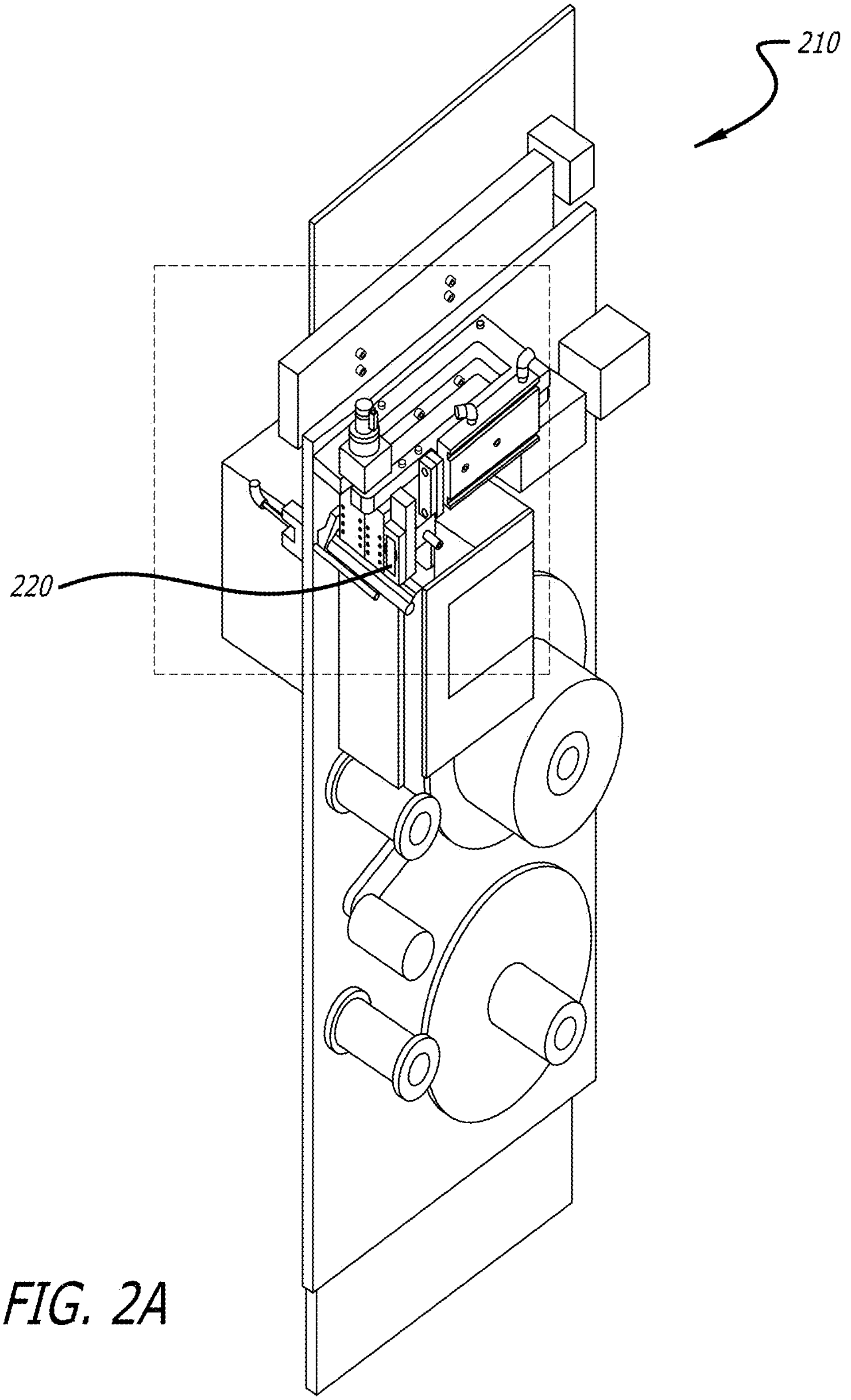
FIG. 2A illustrates an isometric view of an embodiment of a labeler of the system according to the present disclosure.
Figure 2B:
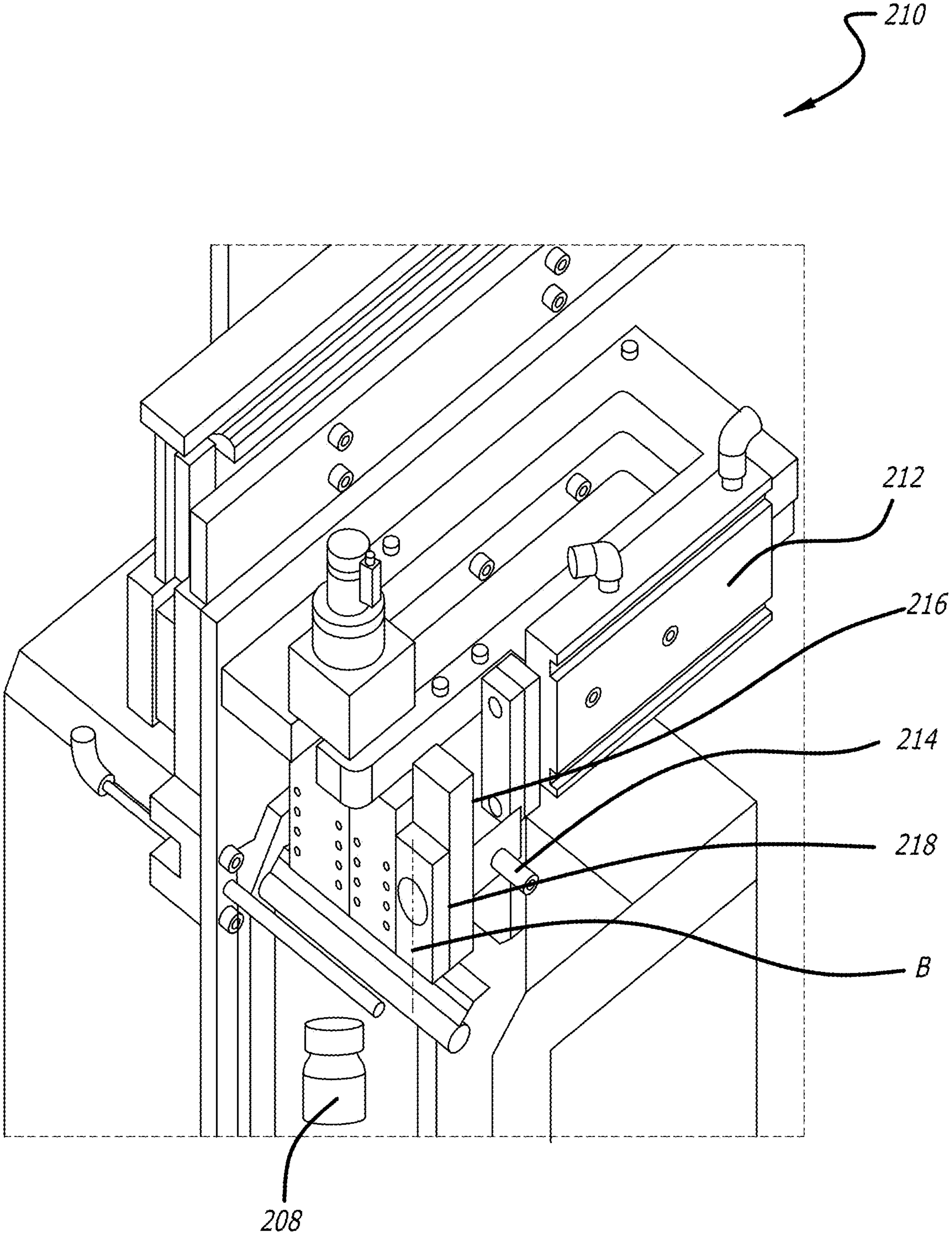
FIG. 2B is an enlarged view of a portion of the embodiment of FIG. 2A.

Turning now to FIGS. 2A-B, a more detailed view of an embodiment of the labeler 210 is illustrated. A label 220 having at least one adhesive portion is provided to the labeler 210. The label 220 may be provided separately by a human or by another optional part of the medicament container system. For example, the medicament container system 100 may employ a label printer which prints identifying information, instructions, etc. onto labels for medicament containers 208. The medicament container 208 may already have a pre-existing label such as from a manufacturer, but further information may need to be put on the medicament container 208 by affixing a secondary label 220. The label 220 may have an adhesive area on at least a portion of a surface. The labeler 210 may be configured to fold the label 220 such that at least a portion of the adhesive area protrudes closer to the location where the medicament container 108 is to be during a labeling operation.

Figure 3B:
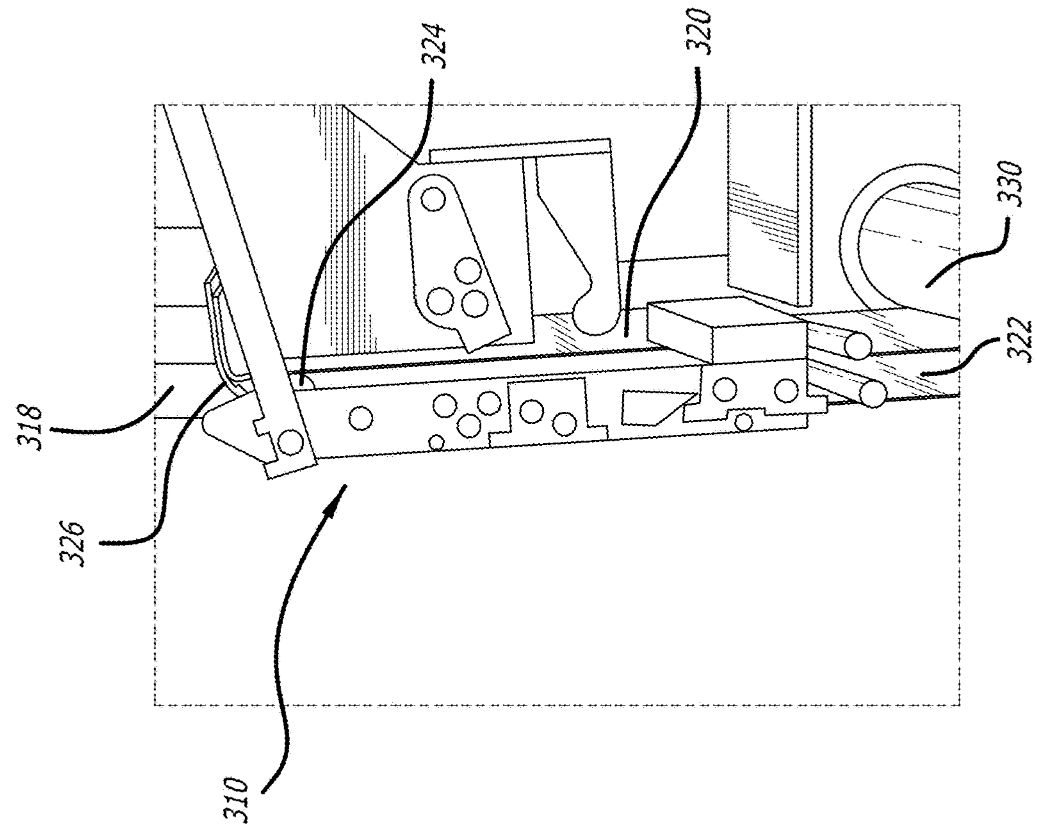
FIG. 3B illustrates a side view of the embodiment of FIG. 3A.
Figure 3A:
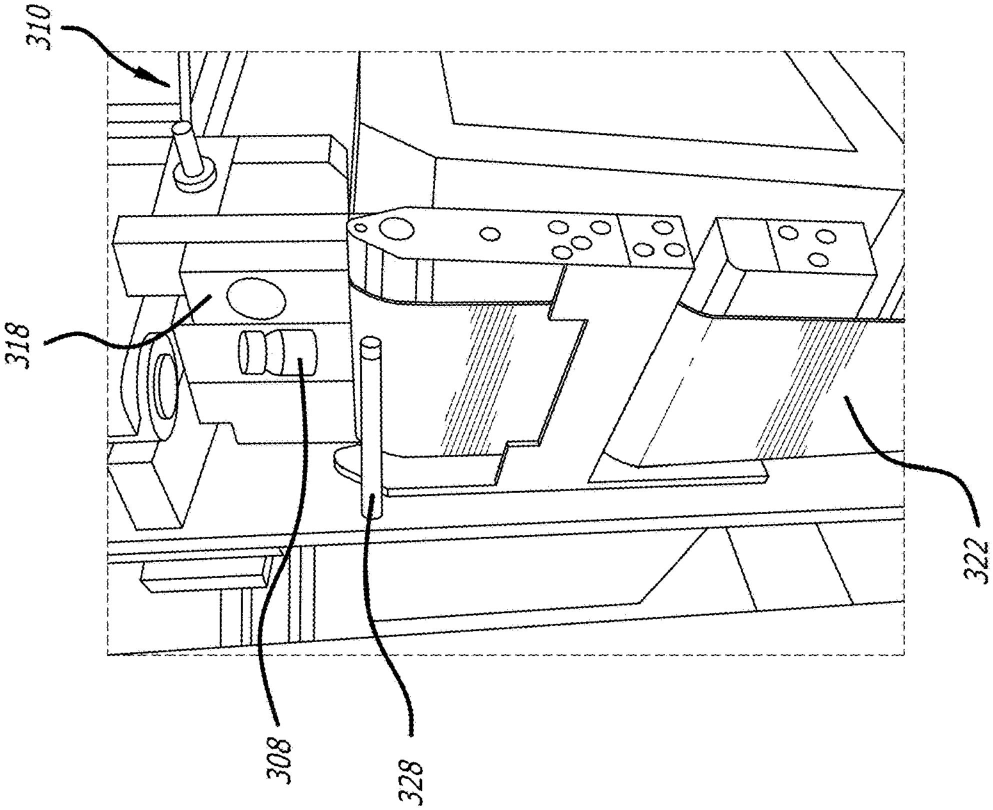
FIG. 3A illustrates an isometric view of another embodiment of a labeler of the system according to the present disclosure.

This may be accomplished by placing the label 220 between a set of rotatable blocks and/or rollers which manipulate the position of the label. Alternatively, a single rotatable block or roller may be used in conjunction with a stationary surface. For example, in FIGS. 3A-B, a label 320 attached to a backing 322 is sent from a spool 330 towards a tamp head 318 after being printed. As the label 320 approaches the tamp head 318, pressure is applied to the label 320 and backing 322 by a roller 324. The roller 324 may cause pressure against a pinching surface 326. The label 320, having a curvature of zero in this embodiment, will tend to stay flat while the backing 322 is pulled downward and away from the label 320, such as in FIG. 3A. The label 320 will thus protrude towards the tamp head 318 in this embodiment, and the tamp head 318 will force the label 320 toward the medicament container 308 at the appropriate time. Different embodiments of the labeling operation are contemplated, and the above example is not intended to limit the scope of the disclosure in any way. For example, a second roller may be employed in place of the pinching surface 326, or a series of rollers or surfaces may be employed throughout the operation. Alternatively, a pneumatic arm 328 may provide a source of air pressure to separate the label 320 from the backing 322 and keep the label 320 against the tamp head 318 before application to the medicament container 308. The system may also employ static electricity to keep the label 320 in certain position against the tamp head 318 before application to the medicament container 308. Further, the system may use the actuator 102 from FIG. 1 to apply pressure from the medicament container 308 against the tamp head 318 to affix the label 320, rather than the tamp head 318 applying pressure to the medicament container 308.

In this manner the adhesive will contact the medicament container 308 before any other part of the label 320 and ensure that the label 320 is correctly oriented for the duration of the labeling operation. Alternatively, an adhesive could be applied to the medicament container 308 corresponding to at least a portion of an area where the label 320 is to be applied. The label 320, optionally without adhesive in this alternative embodiment, may still be folded such that greater control is exercised over the orientation of the label 320 relative to the medicament container 308 during the labeling operation. In such an embodiment, the label 320 may be in a continuous spool 330 with perforations to separate the label 320 from others on the spool 330. The spool 330 can be fed much the same way as in the embodiment of FIGS. 3A-B, except that no backing 322 need be present. As the label 320 is applied to the medicament container 308 it is torn away from the rest of the spool 330.

Returning to the embodiment of FIGS. 2A-B, the labeler 210 may further comprise at least one tamper actuator 212 that moves the tamp head 218. The tamp head 218 may be operatively coupled to a loss motion slide 216. A sensor 214, which may be a pressure sensor, is configured to sense the amount of pressure or force applied between the tamp head 218 and the medicament container 208. When a threshold level of pressure is determined to be present by the sensor 214, the loss motion slide 216 acts as a buffer to make sure that pressure is not exceeded, and the tamper actuator 212 removes the tamp head 218 from contact with the medicament container 208. The loss motion slide 216 may accomplish this by being configured to retract when a threshold pressure is reached. In an alternative embodiment, the sensor 214 may be a position sensor which senses the position of the medicament container 208. When motion is sensed on the medicament container 208 by the sensor 214, the tamper actuator 212 removes the tamp head 218 from contact with the medicament container 208.

The tamp head 218 may comprise a flexible material that conforms to the shape of the medicament container 208 when pressure is applied between the tamp head 218 and the medicament container 208. Alternatively, the tamp head 218 may comprise a rigid material. In such an embodiment, the tamp head 218 may be moved along a perimeter of the medicament container 208 without exceeding a threshold force measurement by the at least one tamper actuator 212. This may be done by rolling or gliding the tamp head 218. Alternatively, the actuator 102 may be configured to move the medicament container 208 in relation to a label that is held in place by the tamp head 218. In any above embodiment, pressure is applied to generally the whole area encompassed by the interface of the medicament container 208 and the label where adhesive is present. The tamp head 218 may be adapted to be as flexible or rigid as desired. Alternatively, the tamp head 218 may comprise a mechanism which applies air pressure to the interface of the label and the medicament container 208. In this manner even pressure may be achieved over the desired area between the label and the medicament container.

The labeling operation is preferably configured to run with each medicament container 208, no matter the size or shape, oriented relative to the tamp head axis B. Because each medicament container 208 is oriented relative to tamp head axis B and pressure measurement is taken to ensure the medicament container 208 does not change position such that the labeling operation can no longer work or the medicament container 208 breaks, the system 100 of FIG. 1 can remain agnostic to the size and/or shape of the medicament container 108/208. Simply put, as long as each medicament container 208 is oriented along the tamp head axis B, the labeling operation can be carried out, and can be carried out without human interaction or complicated, unique patterns programmed into the medicament container system 100 of FIG. 1 beforehand. It is preferable that the pick head axis A and the tamp head axis B are parallel so that the least amount of change in orientation has to occur between picking or grabbing the medicament container 208 and the labeling operation.

Figure 4:
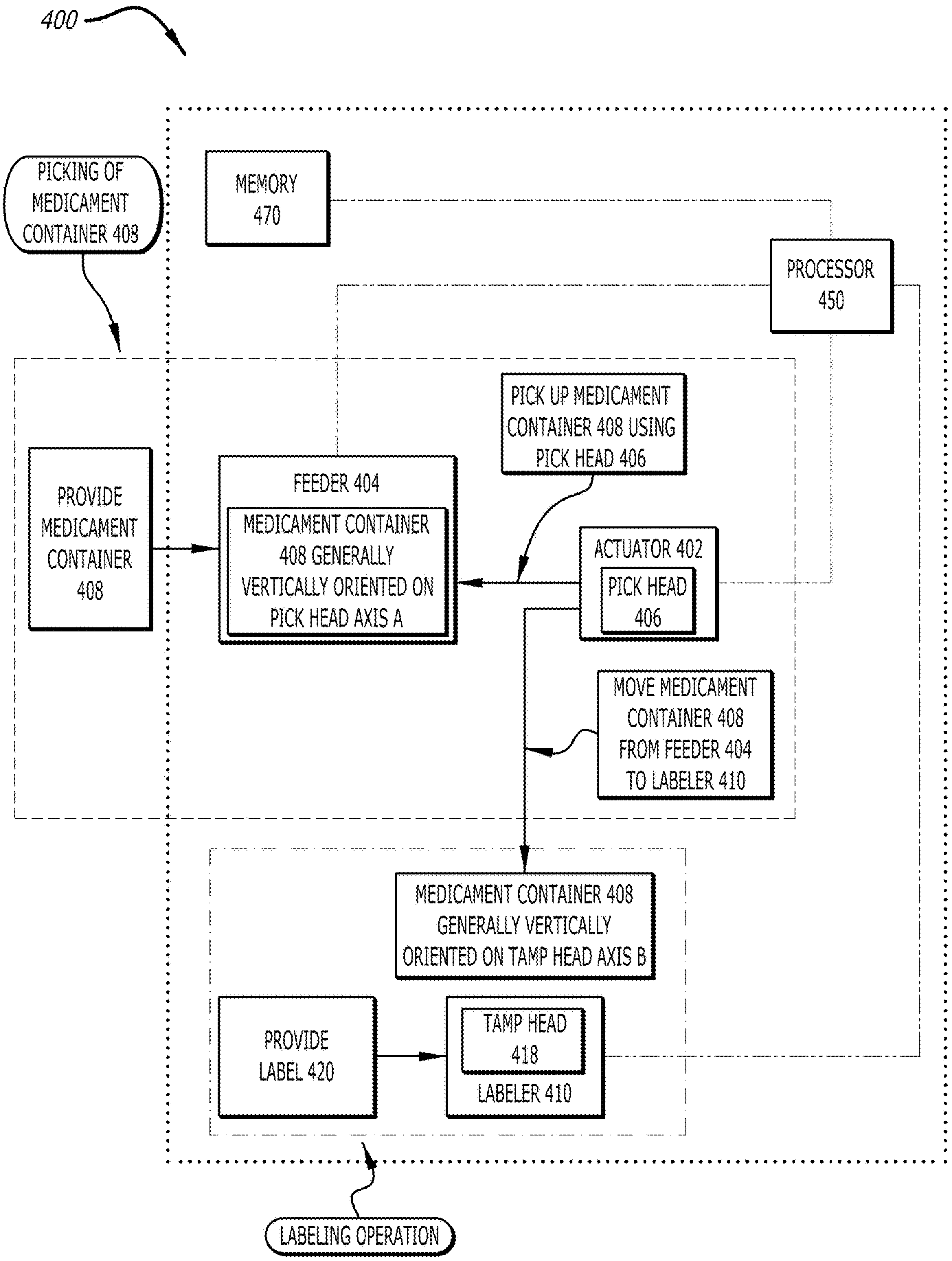
FIG. 4 illustrates a schematic diagram according to an embodiment of the present disclosure.

FIG. 4 illustrates one embodiment of how a medicament container system 400 may run schematically. A processor 450 is operatively coupled at least to an actuator 402 and a labeler 410. The processor 450 may be operatively coupled to memory 470, and memory 470 may store the steps and actions necessary to carry out all the goals of the medicament container system 400. The memory 470 may be integrated in to the medicament container system 400 or may be placed outside of the medicament container system 400 and communicate with the processor 450 wirelessly. The processor 450 may optionally be coupled to a feeder 404 and configured to determine the location of objects in the feeder 404 so that the position of a medicament container 408 in the feeder 404 can be determined automatically. A first operation (picking of medicament container 408) starts with providing the medicament container 408 to the feeder 404. The medicament container 408 will preferably be provided in such a way that in its final position the medicament container 408 is oriented generally vertically on pick head axis A. An actuator 402, picks up medicament container 408 using a pick head axis 406 from the feeder 404 and moves the medicament container 408 from the feeder 404 to the labeler 410 such that in its final position before labeling the medicament container 408 is oriented generally vertically on tamp head axis B. The labeling operation then occurs such that a label 420 is provided to the labeler 410. A tamp head 418 affixes the label to the medicament container 408.

Figure 5:
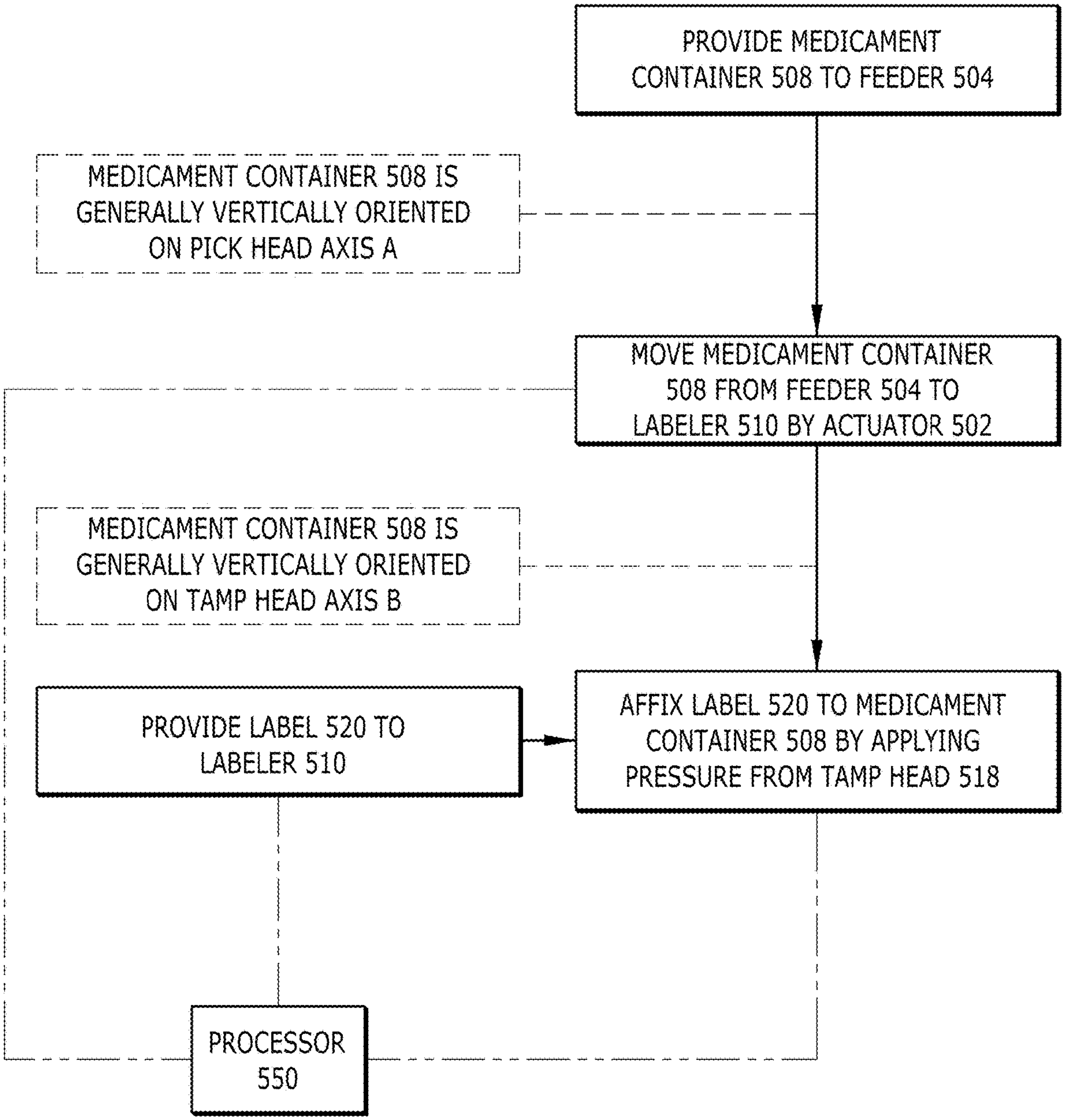
FIG. 5 illustrates a flowchart of a process according to an embodiment of the present disclosure.

FIG. 5 is a flowchart illustrating the typical steps involved. The flow starts with a medicament container 508 being provided to a feeder 504. The medicament container 508 is generally vertically oriented on pick head axis A after this step is complete. The medicament container 508 then moves from feeder 504 to labeler 510 by actuator 502, which is in operative communication with processor 550 and receives prompting from processor 550. The medicament container 508 is generally vertically oriented on tamp head axis B after this step is complete. A label 520 is provided to labeler 510, optionally by prompting of the processor 550 in operative communication with the labeler 510, in order that the label 520 may be affixed to the medicament container 508 by applying pressure from a tamp head 518 based on instruction of the processor 550. It may be advantageous to use more than one processor 550. For example, one processor 550 may be dedicated to moving the actuator 502 and its processes while another processor 550 may be dedicated to the labeler 510 and its processes. The multiple processors may be in operable communication such that the operation is equivalent whether one processor 550 or many are employed.

Tote

Returning to FIGS. 1A-1C, a tote 160 may be provided to the medicament container system 100 corresponding to at least one medicament container 108 being prepared by the medicament container system 100. The tote 160 may be provided by a conveyer. The tote 160 may be provided before the operation of the medicament container system 100 in which case the tote 160 may prompt the medicament container system 100 in which medicament container 108 to prepare and what information needs to be on the label affixed to the medicament container 108. Alternatively, the tote 160 may be provided during or after the operation of the medicament container system 100 and a label may be affixed to the tote 160 with information to distinguish the contents being added to the tote 160. The medicament container system 100 may deposit the prepared medicament container 108 into the tote 160. The medicament container system 100 may deposit the prepared medicament container 108 into the tote 160 in one embodiment by the actuator 102 causing the pick head 106 to drop the medicament container 108 onto a conveyer belt 162 which is configured to move the medicament container 108 toward the tote 160 and drop the medicament container 108 in the tote 160. Alternatively, the actuator 102 may cause the pick head 106 to drop the medicament container 108 directly into the tote 160. Alternatively, the actuator 102 may cause the pick head 106 to drop the medicament container 108 down a drop chute which is provided with a tote 160 at some point along the chute such that the medicament container 108 enters the tote 160. Any appropriate method for moving the medicament container 108 from the actuator 102 to the tote 160 is contemplated. The tote 160 may then move along another conveyer belt 162 toward an area for packing and/or shipping.

Machine Reading and Verification

Machine reading technology may be added to the medicament container system 100 to verify accuracy of the process during or between sequence steps. A typical process may be as follows: (1) verify that the medicament container 108 going into the feeder 104 is the correct medicament container 108 for that shelf 105*a-d* and row 107 by processing an image from camera 180; (2) after picking the medicament container 108 move to a verification point and verify the correct container is in the pick head 106; (3) move medicament container 108 to label position; (4) verify correct label is printed; (5) place label on medicament container 108; (6) verify label is correct and properly affixed to medicament container 108 by processing an image from camera 180; (7) place labeled medicament container 108 in order tote 160. These verification steps or any combination or subcombination thereof may be used depending on the desired level of verification.

The desired verification steps and the information relevant to them may be stored on the processor 150 or the memory 170. Verification may be accomplished by a camera 180, communicatively coupled to the processor 150, configured to capture an image of the ruler and the processor 150 being configured to read the pertinent information from the captured image and compare that information to a set of verification information. Alternatively, at least one barcode scanner in communicative operation with the processor 150 may be employed alongside or in place of the camera to gather the relevant information. Any number or combination of cameras and scanners may be employed to ensure proper verification of the medicament container 108 and/or label.

CONCLUSION

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of these terms also does not exclude the possibility of other unrecited features or elements and is merely meant to be illustrative, unless otherwise implicitly or explicitly contradicted by the context in which it used.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above.

The invention is claimed as follows:

1. A medicament container processing system comprising:
a processor in operable communication with a memory;
an actuator comprising:
a pick head;
a pick head axis;
a feeder configured to move at least one medicament container to a picking position;
a labeler comprising:
a tamp head,
a tamper actuator,
a pressure sensor, and
a loss motion slide; and
a tamp head axis,
wherein the actuator is configured to move the at least one medicament container, which is aligned with the pick head axis, to a labeling area when the at least one medicament container is operably coupled to the pick head,
wherein the tamper actuator is configured to move the tamp head toward the at least one medicament container after the at least one medicament container is in the labeling area and aligned to the tamp head axis,
wherein the pressure sensor is configured to sense a pressure measurement between the tamp head and the at least one medicament container,
wherein the tamp head is configured to affix a label to the at least one medicament container, and
wherein the processor is configured to cause the tamp head to retract from the at least one medicament container when the pressure sensor senses a pressure higher than a threshold pressure level.

2. The system of claim 1, wherein the pick head comprises an annular member with an expandable and contractable diameter configured to enclose a generally circular portion of the at least one medicament container.

3. The system of claim 1, wherein the pick head comprises a plurality of fingers configured to enclose at least a portion of the at least one medicament container.

4. The system of claim 1, wherein the tamp head comprises a rigid material and the tamp head is configured to apply a generally constant pressure to a perimeter of the at least one medicament container.

5. The system of claim 1, wherein the tamp head comprises a stream of air configured to cause contact between a label and the at least one medicament container.

6. A medicament container processing system comprising:
a processor in operable communication with a memory;
an actuator comprising:
a pick head;
a pick head axis;
a feeder configured to move at least one medicament container to a picking position;
a labeler comprising:
a tamp head,
a tamper actuator,
a sensor, and
a loss motion slide; and
a tamp head axis,
wherein the actuator is configured to move the at least one medicament container, which is aligned with the pick head axis, to a labeling area when the at least one medicament container is operably coupled to the pick head,
wherein the tamper actuator is configured to move the tamp head toward the at least one medicament container after the at least one medicament container is in the labeling area and aligned to the tamp head axis,
wherein the sensor is configured to sense a pressure measurement between the tamp head and the at least one medicament container,
wherein the tamp head is configured to affix a label to the at least one medicament container, and
wherein the pick head comprises a suction member configured to removably affix the at least one medicament container to the pick head by vacuum pressure.

7. The system of claim 6, wherein the sensor is configured to sense a displacement of the at least one medicament container and the processor is configured to cause the tamp head to retract from the at least one medicament container when the sensor senses a displacement higher than a threshold displacement amount.

8. The system of claim 6, wherein a label comprising at least one adhesive portion is provided to the labeler in a folded configuration such that at least a portion of the at least one adhesive portion contacts the at least one medicament container before any other portion of the label.

9. A medicament container processing system comprising:
a processor in operable communication with a memory;
an actuator comprising:
a pick head;
a pick head axis;
a feeder configured to move at least one medicament container to a picking position;
a labeler comprising:
a tamp head,
a tamper actuator,
a sensor, and
a loss motion slide; and
a tamp head axis,
wherein the actuator is configured to move the at least one medicament container, which is aligned with the pick head axis, to a labeling area when the at least one medicament container is operably coupled to the pick head,
wherein the tamper actuator is configured to move the tamp head toward the at least one medicament container after the at least one medicament container is in the labeling area and aligned to the tamp head axis,
wherein the sensor is configured to sense a pressure measurement between the tamp head and the at least one medicament container,
wherein the tamp head is configured to affix a label to the at least one medicament container, and
wherein the tamp head comprises a flexible material configured to conform to a shape of the at least one medicament container when pressure is applied between the tamp head and the at least one medicament container.

10. A method of affixing a label to a medicament container, the method comprising:
providing a medicament container to a feeder;
moving the medicament container from the feeder to a labeler by an actuator comprising a pick head, the labeler comprising a tamp head, wherein the medicament container is generally vertically oriented on a pick head axis while provided at the feeder and is generally vertically oriented on a tamp head axis while provided at the labeler;

providing a label to the labeler;

affixing the label to the medicament container by applying pressure from a tamp head while sensing a pressure measurement between the tamp head and the medicament container; and causing the tamp head to retract from the medicament container when the pressure measurement is greater than a threshold pressure level.

11. The method of claim 10, wherein the sensing is conducted by means of a pressure sensor.

12. The method of claim 10, wherein the pick head comprises an annular member with an expandable and contractable diameter configured to enclose a generally circular portion of the medicament container.

13. The method of claim 10, wherein the pick head comprises a plurality of fingers configured to enclose at least a portion of the medicament container.

14. The method of claim 10, wherein the tamp head comprises a stream of air configured to cause contact between a label and the medicament container.

15. The method of claim 10, wherein the pick head axis and the tamp head axis are at least substantially parallel.

16. A method of affixing a label to a medicament container, the method comprising:

providing a medicament container to a feeder;

moving the medicament container from the feeder to a labeler by an actuator comprising a pick head, the labeler comprising a tamp head, wherein the medicament container is generally vertically oriented on a pick head axis while provided at the feeder and is generally vertically oriented on a tamp head axis while provided at the labeler;

providing a label to the labeler; and affixing the label to the medicament container by applying pressure from a tamp head, wherein the pick head comprises a suction member configured to removably affix medicament container to the pick head by vacuum pressure.

17. The method of claim 16, wherein the label comprises at least one adhesive portion, and wherein the label is provided to the labeler in a folded configuration such that at least a portion of the at least one adhesive portion contacts the medicament container before any other portion of the label.

18. A method of affixing a label to a medicament container, the method comprising:

providing a medicament container to a feeder;

moving the medicament container from the feeder to a labeler by an actuator comprising a pick head, the labeler comprising a tamp head, wherein the medicament container is generally vertically oriented on a pick head axis while provided at the feeder and is generally vertically oriented on a tamp head axis while provided at the labeler;

providing a label to the labeler;

affixing the label to the medicament container by applying pressure from a tamp head, wherein the tamp head comprises a flexible material configured to conform to a shape of the medicament container when pressure is applied between the tamp head and the medicament container.

* * * * *